United States Patent [19]

Münscher

[11] 4,062,581
[45] Dec. 13, 1977

[54] SEPARATION DEVICE FOR RELEASING PARACHUTES

[75] Inventor: Dieter Münscher, Vechelde, Germany

[73] Assignee: Deutsche Forschungs- und Versuchsanstalt fur Luft- Und Raumfahrt e.V., Linder Hohe, Germany

[21] Appl. No.: 744,178

[22] Filed: Nov. 22, 1976

[30] Foreign Application Priority Data

Nov. 26, 1975 Germany .............................. 2552935

[51] Int. Cl.² ............................................. B64D 17/38
[52] U.S. Cl. .................................................. 294/83 A
[58] Field of Search ..................... 294/75, 78 R, 82 R, 294/83 R, 83 A; 24/230.5 CS, 241 P, 241 TC, 242; 244/151 B

[56] References Cited

U.S. PATENT DOCUMENTS

| 2,488,537 | 11/1949 | Hattan | 294/83 A |
| 2,831,721 | 4/1958 | Gross | 294/83 A |
| 3,028,187 | 4/1962 | Cahill et al. | 294/83 A |
| 3,259,420 | 7/1966 | Klemm | 294/83 A |

FOREIGN PATENT DOCUMENTS

| 612,097 | 10/1926 | France | 294/83 A |
| 99,113 | 6/1923 | Switzerland | 294/83 R |

Primary Examiner—Johnny D. Cherry
Attorney, Agent, or Firm—Salter & Michaelson

[57] ABSTRACT

A separation device for releasing parachutes from loads enables an attachment to be made between the parachute and the load before the load is dropped and when the load reaches the ground the load is automatically released from the parachute by operation of the device.

The device consists of a hook-shaped body attachable to the parachute lines, the load lines being located in the hook. An ejector member is spring urged towards an ejection position of the load lines and a holding element serves to prevent ejection until after the parachute has operated. While falling, tension holds the load lines on the hook and on reaching the ground the ejector member operates to release the lines from the hook.

9 Claims, 4 Drawing Figures

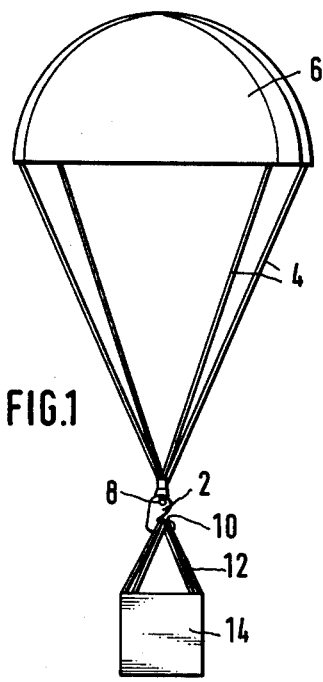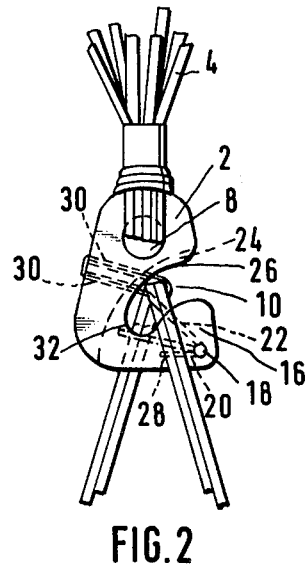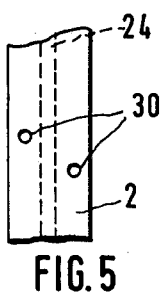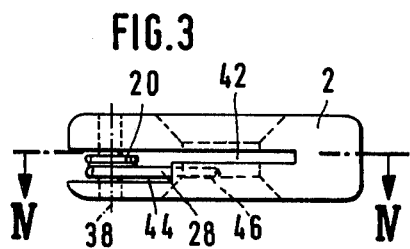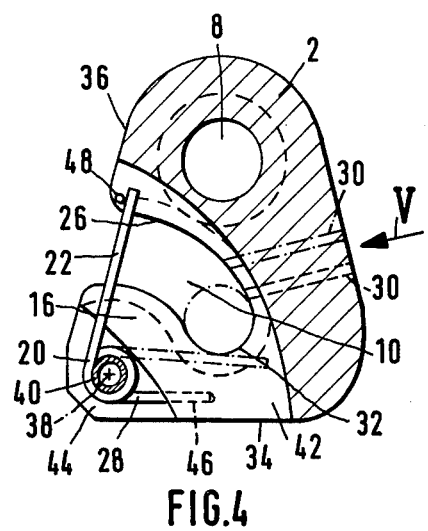

SEPARATION DEVICE FOR RELEASING PARACHUTES

The invention concerns a separation device for releasing parachutes from loads.

When a load is dropped by means of a parachute the parachute is a potential danger to the load after it has landed on the ground. Care must therefore be taken to ensure that the parachute is separated from the load after the load has reached the ground.

Separation devices are known for parachutes used for people and for heavy loads. These known devices are mechanically very complex and thus expensive. In addition they have considerable volume and weight. The known devices are not suitable for small loads or small parachutes since manufacture on the small scale is subject to relatively narrower limits.

The object of the invention is to produce a separation device which is constructed in a mechanically simple manner and which can be manufactured in accordance with requirements in practically any size.

According to the invention a separation device for separating a parachute from a load comprises a hook-shaped body attachable to the lines of a parachute, the body having an opening into the hook for the introduction of lines from a load, an ejector member movable within the hook opening under spring bias to eject the load lines, and holding means by which the load lines can be held in the opening above the base of the opening and against the biassing action of the ejector member, the holding means being so arranged that it is rendered inoperative on operation of the parachute.

Preferably the hook opening is in the form of an arc with its centre of curvature in the neighbourhood of the free limb of the hook.

Conveniently the ejector member is a torsion spring mounted in bearings at the centre of curvature of the hook opening, the spring including an arm which is pivotable along the hook opening, and the free end of the spring arm engages in a groove in the side wall of the hook opening opposite to the hook limb.

The device conveniently has bores in the hook-shaped body for locating threads constituting the holding means, the bores leading into the hook opening at a distance above its base. It is convenient in this case to arrange one bore on each side of the groove which accepts the end of the spring arm. The bores are preferably inclined at an angle to radii of curvature of the hook opening at the opening of the bores.

The invention will now be described with reference to the accompanying drawings which show an embodiment of the invention by way of example only. In the drawings:

FIG. 1 is an elevation showing a parachute with a load attached by means of a separation device according to the invention, FIG. 2 is a side view of the separation device, FIG. 3 is a plan view showing the separation device from below, FIG. 4 is a section along the line IV—IV in FIG. 3, and FIG. 5 is a view in the direction of the arrow V in FIG. 4.

Referring to FIGS. 1 and 2, a separation device 2 is attached to parachute lines 4 of a parachute 6. In this case the parachute lines are passed through a bore 8 in the separation device. The separation device 2 is in the form of a load hook and lines 12 from a load 14 are attached within a hook opening 10. As can be seen from FIGS. 2 and 4, the hook opening is in the form of an arc, conveniently a circular arc, of which the centre of curvature lies in the neighbourhood of a free limb 16 of the hook. In the hook limb 16 a torsion spring 20 with pivot 18 is mounted in bearings and engages by means of a spring arm 22 in the hook opening 10, with the free end of said spring arm 22 preferably engaging in a groove 24 in the opposite side 26 of the hook opening. A second arm 28 of the spring is fixed and may, for example, be inserted in a suitable bore in which it is locked.

The spring arm 22 is pre-stressed in such a way that in its relaxed position it lies in the neighbourhood of the entry to the opening 10, as shown in FIG. 4. In the hook-shaped body of the separation device there are provided two bores 30 arranged at a distance from each other and opening in the central region of the opening of the hook at a distance above a base 32 of said hook opening 10.

When the load 14 is attached to the device 2 the load lines 12 are introduced into the hook opening 10, applied against the spring arm 22 and moved up to the position as shown in FIG. 2. A securing thread or wire is then introduced through the apertures 30 and is led round the loop of load lines and is fastened by for example, knotting on the external side of the load hook. By means of the securing thread the spring arm 22 and the loop of the load lines are held in a central position so that the load lines are secured against slipping out of the hook opening.

After the load lines 12 have been fixed within the separation device 2 in this way the load 14 with the parachute 6 attached to it is ready to be dropped.

When the parachute is activated, that is by extending and tensioning the assembly of the load, the separation device and the parachute, the securing threads are broken by the tensioning force and filling the parachute. The load lines 12 are forced against the base 32 of the hook opening 10 against the force of the tension spring 20.

When the load 14 lands on the ground the pull on the load lines 12 is removed so that the torsion spring 20 is able to eject the load lines 12 from the hook opening by means of the spring arm 22 and thus the parachute is separated from the load. Separation takes place completely independently of the position which the separation device adopts relative to the load or the parachute. The only necessary condition is a slack in the lines 12 at least equal to the difference in height between the base of the hook opening and the highest point of the hook limb 16. The force which has to be applied by the spring is dependent only on the resistance acting on the slackened lines, in particular in the form of frictional resistance in the hook opening. This resistance can be kept low by providing a smooth opening. Since the force of the spring needs only to be relatively small, even a relatively thin and thus easily broken securing thread or wire is sufficient for the attachment of the load lines. Since metallic springs, in particular torsion springs, retain their resilience for practically unlimited periods even under pre-stress it would, for example, be possible for loads for emergency use which have been connected to a parachute in the manner described above to be kept ready for dropping at any time over an unlimited period.

The separation device according to the invention can be manufactured in practically any size. The dimensions are determined only by the load and, of course, the separation device must, on the one hand, be dimensioned for a predetermined load, while on the other hand, the hook aperture must be designed to fit the load lines.

The separation device is now described in further detail with reference to FIGS. 3 to 5. As can be seen from these FIGS., the separation device is designed as an approximately plate-shaped body whose edges are rounded off on all sides and which has a straight base surface 34. The plate-shaped body tapers towards the upper end in which the bore 8 for attachment of the parachute cords is formed. The hook-shaped aperture 10 starts from a sloping side face 36 and is formed as the arc of a circle in which the centre of curvature of the hook opening 10 coincides with the axis 38 of a spring cage 40 on which the torsion spring 20 is mounted in bearings. In order to accommodate the torsion spring the plate-shaped body is slit in the region of its hook limb 16 to above the upper limit 26 of the hook opening 10. In the region of the coil of the spring this slit has a lateral enlargement 44 from which extends a bore 46 locating the spring arm 28. The spring arm 22 extends at right angles through the hook opening 10 and lies with its free end in the region of the slit 42 close to the wall 26. In the position for release of the load the spring arm lies close to the opening of the hook aperture 10. This position may be the relaxed position of the spring arm, however it is also possible to provide a stop pin 48 against which the spring arm 22 is applied with prestress. The two bores 30 are formed in the plate-shaped body and open at a distance above the base 32 of the hook opening 10. These bores are formed to be sharp-edged at their ends and are conveniently angled to radii from the centre of curvature of the hook aperture at the ends so that the lower edges of the openings of the bores form acute-angled cutting edges in the neighbourhood of the hook opening. As is shown in FIG. 5 the two bores 30 are conveniently displaced laterally relative to each other and, in particular, in such a way that they open, respectively, on each side of the groove 24.

What we claim as our invention and desire to secure by Letters of Patent of the United States is:

1. An automatic separation device for separating a parachute from a load, comprising a body having an opening formed therein that defines a hook portion on which a free end is formed, said opening receiving a connecting means for said load therein and being formed as an arc of a circle, the center of curvature of which is located in the free end of said hook portion, a torsion spring mounted in the free end of said hook portion and including a spring arm that extends outwardly of said free end and spans the arcuate shaped hook opening, said spring arm being pivotal about the axis of said spring for movement from a load tensioned position adjacent to the inner end of said opening to an ejecting position adjacent to the exposed outer end of said opening, the axis of said spring being substantially coincident with the center of curvature of said arcuate opening, and frangible means mounted on said body adjacent to said opening for initially securing said connecting means in said arcuate opening intermediate the inner and exposed outer ends thereof during securement of said load to said parachute, wherein said frangible means is ruptured upon dropping of said parachute to cause said connecting means to force said spring arm to the tensioned position thereof, whereafter said spring arm ejects said connecting means from said hook portion when moved to the ejecting position upon landing of said parachute and load attached thereto upon a surface.

2. A separation device as claimed in claim 1, said hook portion having a longitudinal slit formed therein, said slit being enlarged in the free end of said hook portion to accommodate the coil of said tension spring, a bore communicating with the enlarged portion of said slit and receiving a second arm of said spring therein.

3. A separation device as claimed in claim 1, said body having a generally triangular configuration as seen in side elevation, an opening being formed in a corner of said body for receiving parachute lines therein for attachment of said body to said parachute, the center of curvature of the hook opening being located generally in one of the other corners of said body.

4. A separation device as claimed in claim 1, said body having a groove formed therein opposite to said free end and adjacent to said hook opening, the outermost end of said spring arm being received in said groove for movement therein from the tensioned to the ejecting positions.

5. A separation device as claimed in claim 4, a slit formed in the free end of said hook portion and being located in alignment with the groove in said body portion, said slit and groove merging adjacent to the base of the hook opening.

6. A separating device as claimed in claim 4, spaced bores formed in said body in spaced, parallel relation and extending into said hook opening above the base thereof and in spaced lateral relation with respect to said groove.

7. A separating device as claimed in claim 6, said bores being inclined relative to the radius of curvature of said hook opening.

8. A separation device as claimed in claim 1, spaced bores formed in said body and communicating with said hook opening above the base thereof, said frangible means being defined by securing thread that is received and secured in said bores.

9. A separating device as claimed in claim 8, said spaced bores being located in offset parallel relation to each other.

* * * * *